United States Patent
Staiger et al.

(10) Patent No.: US 11,802,747 B2
(45) Date of Patent: Oct. 31, 2023

(54) FIREARM ANALYSIS DEVICES

(71) Applicant: HECKLER & KOCH GmbH, Oberndorf (DE)

(72) Inventors: Markus Staiger, Vöhringen (DE); Mark Scheuermann, Oer-Erkenschwick (DE); Johannes Alexander Kopf, Dunningen (DE); Dietrich Gebert, Nagold (DE); Dieter Rimpf, Backnang (DE)

(73) Assignee: HECKLER & KOCH GmbH, Oberndorf (DE)

( * ) Notice: Subject to any disclaimer, the term of this patent is extended or adjusted under 35 U.S.C. 154(b) by 0 days.

(21) Appl. No.: 17/681,302

(22) Filed: Feb. 25, 2022

(65) Prior Publication Data

US 2022/0412684 A1 Dec. 29, 2022

(30) Foreign Application Priority Data

Feb. 25, 2021 (DE) ...................... 10 2021 104 517.7

(51) Int. Cl.
*G01P 3/66* (2006.01)
*F41A 31/00* (2006.01)

(52) U.S. Cl.
CPC ................ *F41A 31/00* (2013.01); *G01P 3/66* (2013.01)

(58) Field of Classification Search
CPC . F41A 31/00; F41A 19/01; G01P 3/66; G01R 19/16538

(Continued)

(56) References Cited

U.S. PATENT DOCUMENTS

| 5,402,678 A | 4/1995 | Fritz et al. |
| 7,747,415 B1 * | 6/2010 | Churchill ............... G01P 1/127 |
| | | 702/42 |

(Continued)

FOREIGN PATENT DOCUMENTS

| DE | 4203585 | 8/1993 |
| EP | 2642237 | 9/2013 |

(Continued)

OTHER PUBLICATIONS

European Patent Office, "Extended Search Report," issued in connection with European Patent Application No. 22158688.6, dated Jul. 11, 2022, with English translation, 14 pages.

(Continued)

*Primary Examiner* — Christopher P McAndrew
(74) *Attorney, Agent, or Firm* — HANLEY, FLIGHT & ZIMMERMAN, LLC

(57) ABSTRACT

The invention relates to a firearm analysis device for determining parameters which are indicative for a firearm from a shot which has been discharged from the weapon, as well as a corresponding method, a corresponding firearm and a computer program product. The device comprises a voltage generating unit which generates an alternating voltage (Ue) during a counter-recoil travel and/or recoil travel of a movable weapon part occurring during a firing. The device is characterized by a signal processing unit which generates a measurement signal (IN$_+$) from the generated AC voltage (Ue), a signal evaluation unit which determines a first time point and a second time point during the counter-recoil travel and/or recoil travel of the movable weapon part, and a time determination unit which determines a time period duration between the first time point and the second time point.

16 Claims, 9 Drawing Sheets

(58) Field of Classification Search
USPC .......................................................... 324/161
See application file for complete search history.

(56) References Cited

U.S. PATENT DOCUMENTS

| | | | |
|---|---|---|---|
| 8,046,946 B2 | 11/2011 | Packer et al. | |
| 10,415,914 B2 | 9/2019 | Lamparter et al. | |
| 2004/0200109 A1* | 10/2004 | Vasquez | F41C 27/00 |
| | | | 42/1.01 |
| 2007/0144396 A1 | 6/2007 | Hamel et al. | |
| 2010/0251586 A1* | 10/2010 | Packer | F41A 19/01 |
| | | | 42/1.01 |
| 2015/0301125 A1* | 10/2015 | Maekawa | G01R 19/16538 |
| | | | 324/764.01 |
| 2018/0142978 A1* | 5/2018 | Lamparter | F41A 19/01 |
| 2018/0158321 A1* | 6/2018 | Choi | G06F 3/0346 |
| 2018/0212522 A1* | 7/2018 | Rexha | G01R 31/40 |
| 2019/0383573 A1 | 12/2019 | Libotte et al. | |
| 2020/0333096 A1* | 10/2020 | Galie | F41A 19/01 |
| 2020/0348710 A1* | 11/2020 | Lintonen | G05F 3/24 |
| 2020/0393499 A1* | 12/2020 | Culca | G01R 19/16547 |

FOREIGN PATENT DOCUMENTS

| | | |
|---|---|---|
| EP | 3 140 605 | 3/2017 |
| JP | 2008064406 | 3/2008 |
| WO | 2009156944 | 12/2009 |
| WO | 2018158321 | 9/2018 |

OTHER PUBLICATIONS

German Patent Office, "Office Action", issued in connection with German Patent Application No. 10 2021 104 517.7, dated Nov. 18, 2021, with English Translation, 22 pages.

* cited by examiner

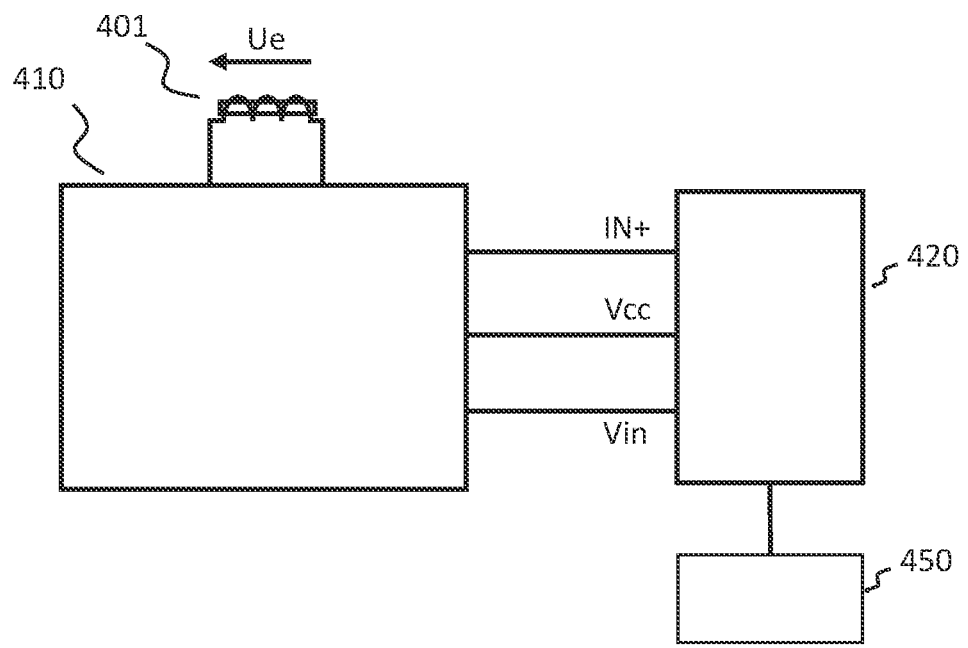

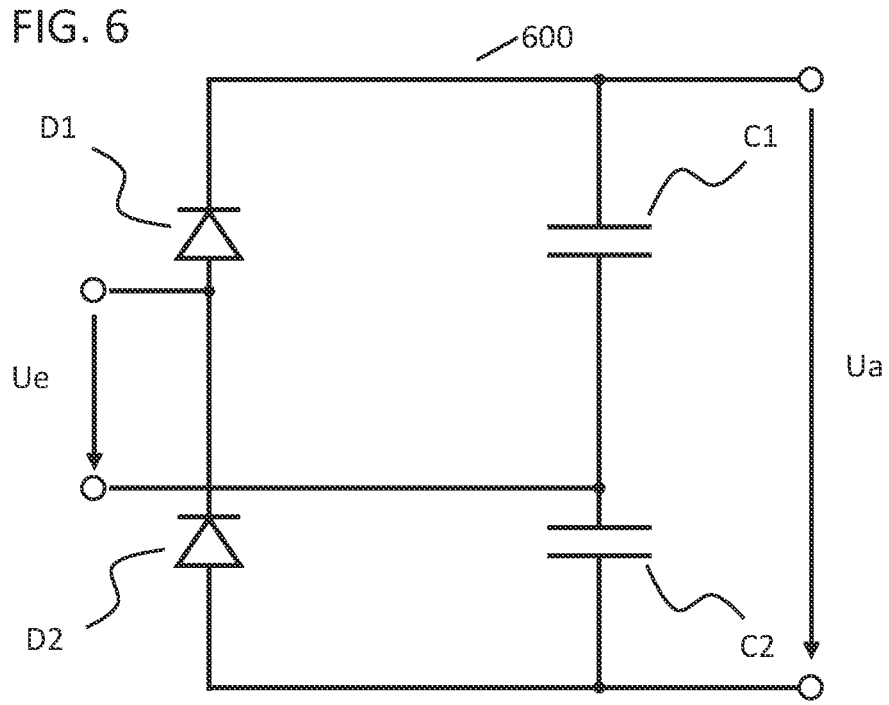

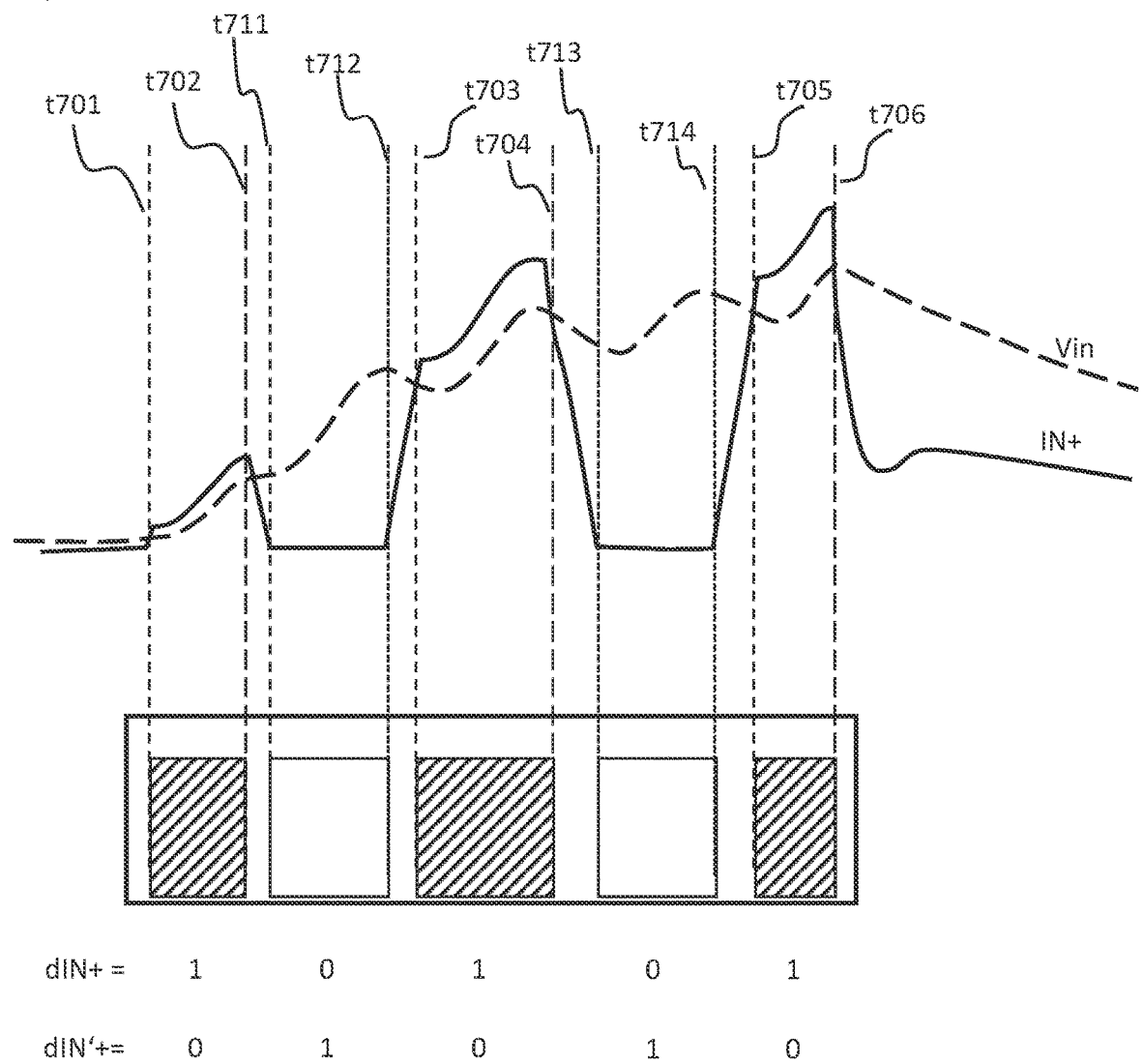

FIREARM ANALYSIS DEVICES

CROSS-REFERENCE TO RELATED APPLICATION

This patent application claims the benefit of and priority to German Patent Application No. 10 2021 104 517.7 filed Feb. 25, 2021, which is hereby incorporated herein by reference in its entirety.

FIELD OF THE DISCLOSURE

The disclosure relates to firearms and, more particularly to firearm analysis devices.

BACKGROUND

In this application, positional designations such as "up," "down," "left," "right," "front," "rear," etc. refer to a firearm that is held in a normal firing position with the axis of the sighting located as horizontal and firing forwards away from the shooter.

It is known method to utilize shot counters in order to record whether a shot was fired with a firearm and to thereby count the shots fired with a firearm. In particular, shot counters are known that utilize electrical signals to count the number of shots fired. The signals consist of electrical voltages that are induced by a magnet-coil arrangement, which is installed in the weapon, when a shot is fired.

U.S. Pat. No. 8,046,946 B2 (Packer Engineering, Inc.) describes a shot counter device for a firearm that includes a specific solenoid-coil arrangement. In this case, the coil is formed by continuous wire windings having a reverse loop on non-magnetizable elements, whereby the induced voltages of adjacent magnetizable coil elements add up. Due to this setup, the field currents induced by the sweeping movable bar magnets therefore accumulate and add up to a maximum, rectified total current. The resulting signal serves as the basis for determining the number of shots fired.

EP 3 140 605 B1 (Heckler & Koch GmbH) discloses an example battery-free shot counter with a solenoid-coil arrangement in which alternately poled permanent magnets sweep a coil with a soft-magnetic core during the recoil and counter-recoils travel of the breech. The coil winding surrounds the soft magnetic tine-shaped core or one of its tines. Unlike the coil described in U.S. Pat. No. 8,046,946 B2 (Packer Engineering, Inc.), this coil does not indicate reversing loops and, because the tines are utilized in this case, the magnetic fields are added up rather than voltages i.e., when the permanent magnets sweep the coil, then they generate a sequence of voltage pulses with oppositely oriented voltage amplitudes i.e., a (non-added) AC voltage. Based on the additional phase information, which is obtained in this way, this signal makes it possible to distinguish not only between the number of shots which have been fired but also between the counter-recoils and recoil travel of the breech.

Using the information of known shot counters, for example, conclusions can be drawn about the wear and tear of a firearm via the information gained regarding the firing of a firearm as well as obtained from known shot counters.

BRIEF DESCRIPTION OF THE DRAWINGS

FIG. 4 shows a circuit for generating, processing and evaluating the signals.

FIG. 6 shows a Delon circuit.

FIG. 7 shows sequences for a measurement signal and a reference signal as well as examples of first and second time points and the digitalization of the measurement signal.

DETAILED DESCRIPTION

Figure 1:
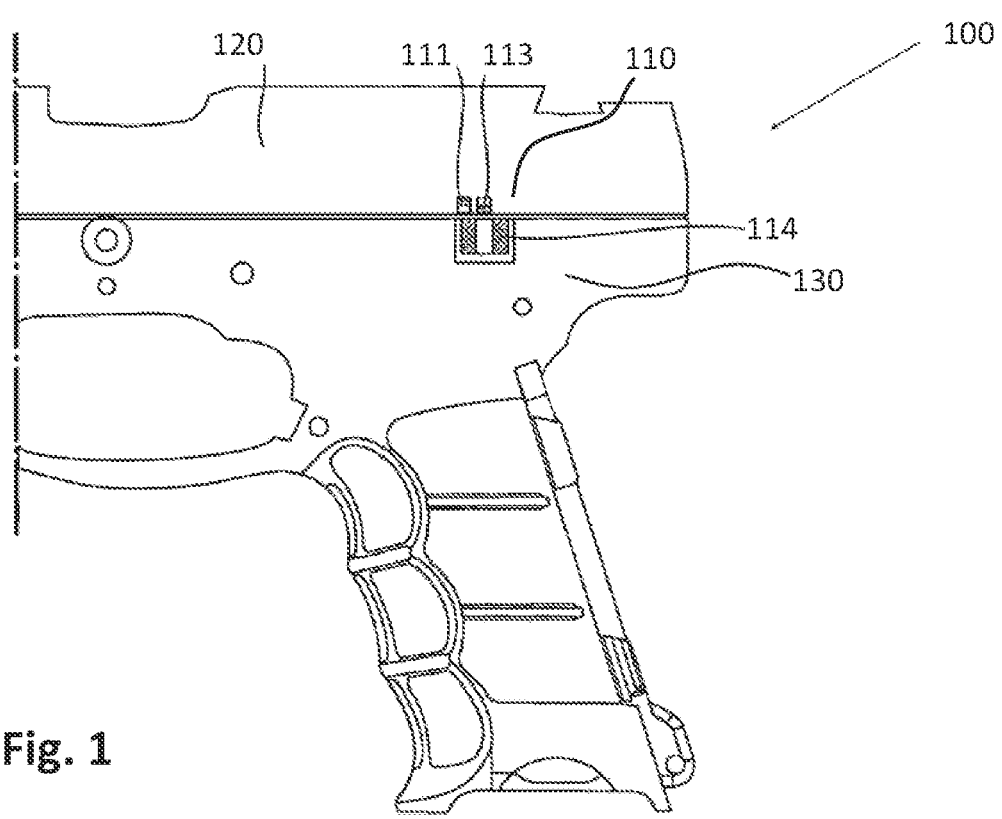
FIG. 1 shows a part of a firearm with a voltage generating unit.

All figures utilize the same reference signs throughout for the same or similar elements. Explanations of one figure thereby also apply mutatis mutandis to the other figures.

The disclosure relates to firearms and, more particularly to firearm analysis devices a firearm analysis device for determining parameters which are indicative for a shot which is discharged from a firearm, and to a corresponding firearm analysis method for determining parameters which are indicative for a shot which is discharged from a firearm by means of such a firearm analysis device. The disclosure also comprises a firearm which includes a firearm analysis device. Furthermore, the disclosure also comprises a computer program product which includes computer-readable instructions for performing some of the method steps.

The firearm analysis devices, which are described below, are basically suitable for analyzing and counting shots which are fire and other movements of firearm parts. For example, breech movements during manual loading or unloading of a firearm can also be detected, analyzed and, if desired, counted.

During analyzing, indicative parameters are determined for the firearm, especially for a movement of parts of the firearm. This includes, for example, parameters such as number of shots fired, time and date of firing, duration of firing, as well as speed, acceleration and time intervals of movements of parts of the firearm. Furthermore, cadences and firing modes (continuous fire, single fire) can be determined.

The firearms can be, for example, short weapons or long weapons. Within the scope of the following explanations, breechblocks, breech mechanisms and slides will serve as examples of weapon parts which move during firing, and grips or weapon housing elements will serve as examples of stationary weapon parts. In principle, all weapon parts which move relative to one another when a shot is fired can be utilized in order to generate signals. In particular, this includes, on the one hand, parts which move when the weapon is loaded or during any other comparable occurrence and, on the other hand, parts which therefore remain stationary relative to these. In this respect, the parameters which are determined also provide specific information about the respective moving weapon parts and the firearm analysis devices can thereby also serve as a sensor for data on the corresponding weapon parts e.g., for the slide.

In the examples described, the voltage generating unit can have alternating pole permanent magnets which are arranged in a row in a movable part of the firearm, for example in the slide or breech of the firearm. When the movable part moves forwards or backwards, then the permanent magnets therefore move with their alternating pole ends on a path which is relative to a stationary coil with a soft magnetic core arranged, for example, in the grip of the firearm. The permanent magnets pass through the coil sequentially and thereby induce an alternating voltage signal due to the alternating polarity.

Using the example of a shot counter as described in EP 3 140 605 B1 (Heckler & Koch GmbH) and which is shown in FIG. 1, an example of a possible example of a voltage generation unit will initially be explained.

The voltage generating unit 110, which is therefore indicated there comprises, for example, a first magnetic pole 113, a second magnetic pole 111, and a coil 114. The first and second magnetic poles 111, 113 are thereby arranged one after the other in such a way that they have opposite polarizations to one another and they move on a path which is relative to the coil 114 in response to a shot being fired. In doing so, they pass through the coil in succession in such a way that they induce voltages of opposite signs in the coil in succession during a recoil travel or counter-recoil travel, respectively. The first and second magnetic poles 113, 111 are arranged here in the slide 120 of the firearm 100. The soft magnetic core and the coil 114 are arranged in the grip 130. The soft magnetic core is configured with three prongs and the coil 114 is wound around the center prong.

More generally, any arrangement of two or more alternately poled permanent magnets is suitable. In particular, the arrangement can consist of an even number of 2N permanent magnets. More than one coil can be present also and the coil/coils can indicate other shapes.

Figure 2A:
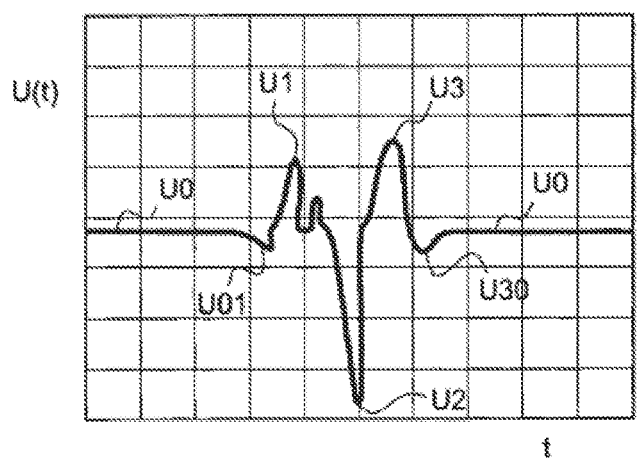
FIG. 2a shows a full voltage signal at an induction coil when a breech slide of the firearm is moved backwards with respect to the voltage generating unit.
Figure 2B:
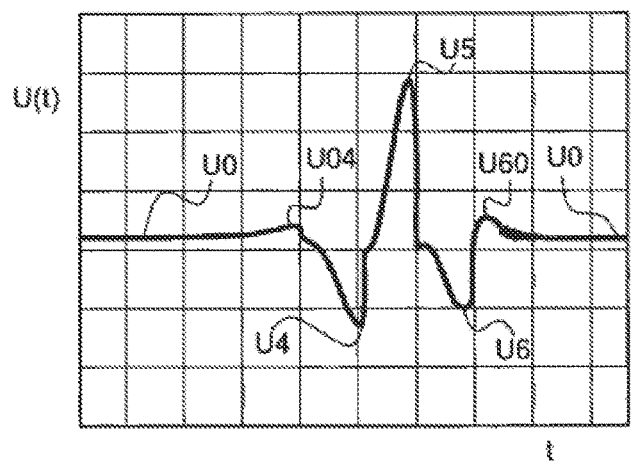
FIG. 2b shows a complete voltage signal on the induction coil when the breech slide of the firearm is moved forwards with respect to the voltage generating unit.

Due to an even-numbered arrangement of the permanent magnets, two different voltage waveforms with oppositely oriented voltage amplitudes are induced when the slide moves forwards and backwards. FIGS. 2a and 2b show examples of such voltage characteristics during recoil travel and counter-recoil travel (FIGS. 2a and 2b, respectively); here for the case of two permanent magnets and a coil with a soft magnetic core.

FIG. 2a is a representation of the voltage waveform U(t) over time of the voltage between a first coil terminal and a second coil terminal during a slide recoil which has been caused by a shot release. Before the first or second magnets move into the region of the coil 114, a voltage value U0 is measurable. When the first magnet 113 enters the area of the center prong of the coil core, then the magnetic field alters there, inducing a first voltage swing U1. When the second magnet 111 subsequently enters the area of the center tine of the coil core, then the magnetic field is reversed by 180°, which induces a second voltage swing of U2. Due to the reversal of polarity, its course is opposite to that of the first voltage swing of U1 and its amplitude, due to the greater relative alteration in field strength, is substantially greater than that of the first voltage swing of U1. In the example shown, the amplitude of the second voltage swing U2 is at least one and a half times greater than the amplitude of the first voltage swing of U1. As soon as the magnets leave the area of the center prong of the coil core again, then the magnetic field in the center prong weakens. This renewed alteration in the field causes the third voltage swing of U3.

However, since no polarity reversal is associated with the weakening, then the amplitude of the third voltage swing of U3 is much smaller than the amplitude of the second voltage swing of U2. In the example shown, the amplitude of the second voltage swing of U2 is at least one and a half times as large as the amplitude of the third voltage swing of U3. After the third voltage swing of U3, the voltage returns to the permanent voltage value of U0.

The voltage curve of U(t) also indicates smaller voltage swings of U01, U30. The first smaller voltage swing of U01 occurs when the first magnet 113 passes the front tine without coil windings. The second smaller voltage swing of U30 occurs when the second magnet 111 passes the rear tine without coil windings.

The voltage curve which is induced during the counter-recoil travel is quite analogous, but with the opposite sign. This is indicated with its corresponding voltage values of U0, U4, U5, U6, U04 and U60 in FIG. 2b.

Figure 2C:
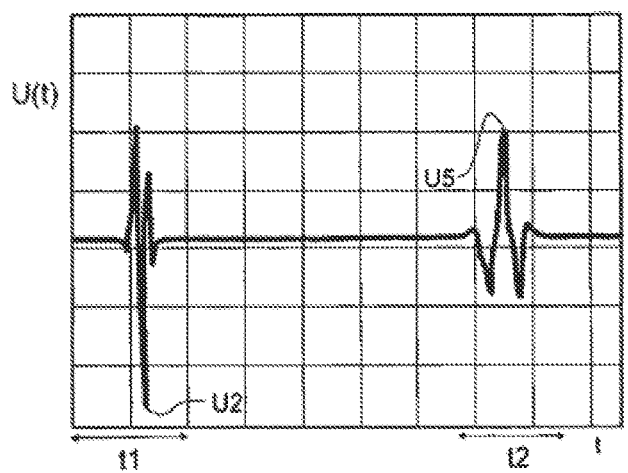
FIG. 2c shows a voltage waveform with a complete signal at the induction coil when the firearm is fired with the voltage generating unit having a breech return signal and a breech advance signal.

In addition to the sign, the signals of the recoil travel and the counter-recoil travel also differ quantitatively in the magnitudes of the amplitudes and in their durations. This can be seen for example, in FIG. 2c. The signal resulting from a slide recoil is seen within a first-time range of t1 and the signal resulting from a slide counter-recoil is seen within a second, later time range of t2. As one can see here, t1 is therefore shorter than t2 in this case. This is due to the fact that the recoil travel of the slide, which is caused directly by the firing, occurs at a higher speed than the counter-recoil travel which is caused by the slide spring. The faster recoil also provides faster amendments in the magnetic field and thereby higher induced voltages. Therefore, the voltage value U2 is also higher than the voltage value U5.

Such induced signals can then be fed to a signal evaluation unit e.g., consisting of a microcontroller, for analysis. Before this, the signals can be further processed and/or pre-processed in one or more signal processing units, such as filter circuits, rectifier circuits or amplifier circuits.

Furthermore, if more than two solenoids 111, 113 are utilized, then the signal can be extended accordingly. A longer signal can, for example, be amplified by a circuit which cumulates the voltage. A correspondingly long-lasting and strong signal can then also be utilized in order to supply voltage to additional components, e.g., e-paper displays.

Due to the manufacturing process, there can be varying distances located between the moving and stationary weapon parts during a movement. The distances can also vary from weapon to weapon. Since the magnetic field strength alters with the square of the distance, the signal strengths vary greatly depending on these tolerances. This can make reliable shot detection problematic. For example, required general signal thresholds can be difficult to establish reliably due to signal variations. And, for example, due to the aforementioned signal fluctuations, a general tolerance setting of signal thresholds to determine possible shot releases or manual through-loads is difficult to implement in practice. In addition to the fluctuations, the signal can be too weak overall due to too large distances. Ultimately, therefore, signal fluctuations must either be reduced and/or the required threshold values must be determined dynamically i.e., taking individual signal fluctuations into account. In addition, or possibly independently of this, it must therefore always be ensured that the measured signals are sufficiently strong for a meaningful measurement.

Theoretically, permanent sliding contacts or spring-loaded contacting signal generating elements can be utilized. They would retain the distances between the permanent and coil cores and thereby their tolerances, which enter into the signal intensity precisely as the square of their distances, sufficiently constant and also low. In practice, however, this would require considerable additional design effort.

One advantageous manufacturing solution for increasing the induced voltages is to arrange several rows of permanent magnets in parallel i.e., next to each other. In particular, 2N permanent magnets can be utilized. In this case, the coil with a three-angled soft magnetic core, which has already been explained for FIG. 1, would be rotated by 90°. For example, if difficulties arise in the arrangement of the signal-generating magnets as indicated in FIG. 1 due to large or varying distances between the signal-generating magnets and coils caused by the equipment, then the magnets can therefore be assembled in several parallel rows with alternating polarities on the moving part of the shot counter device.

FIGS. 3a-d indicate some examples of the arrangement of a coil with a three-angled magnetizable core and a row of alternately poled permanent magnets. The signal can be amplified and prolonged by extending the series with additional soft magnets. If the induced voltage is also utilized in order to operate the signal evaluation unit, e.g., a microcontroller, as explained e.g., in EP 3 140 605 B1 (Heckler & Koch GmbH), then the duration of the available operating voltage will depend on the number of magnets arranged in series. The more magnets which are arranged in series, the longer the signal duration and thereby the duration of the available operating voltage for signal processing.

Figure 3A:
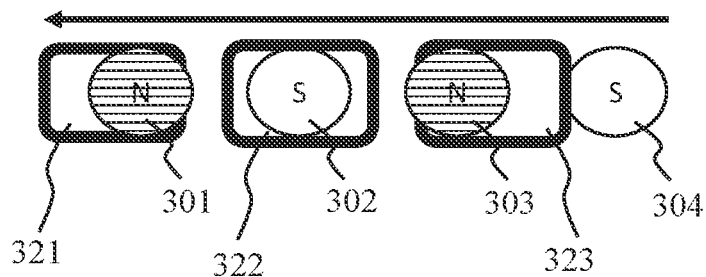
FIGS. 3a-3d show arrangements of magnets and coils for generating the usable voltages.

FIG. 3a schematically indicates four alternately poled permanent magnets 301-304, which are arranged in series, sweeping over a coil with a three-pronged core. The tines 321-323 are arranged in a horizontal direction. Each rectangle represents one tine 321-323 as viewed from above. The magnets sweep over the coil in the direction of the arrow. By arranging the magnets in a row, the induced signal is extended, but still not yet amplified.

Figure 3B:
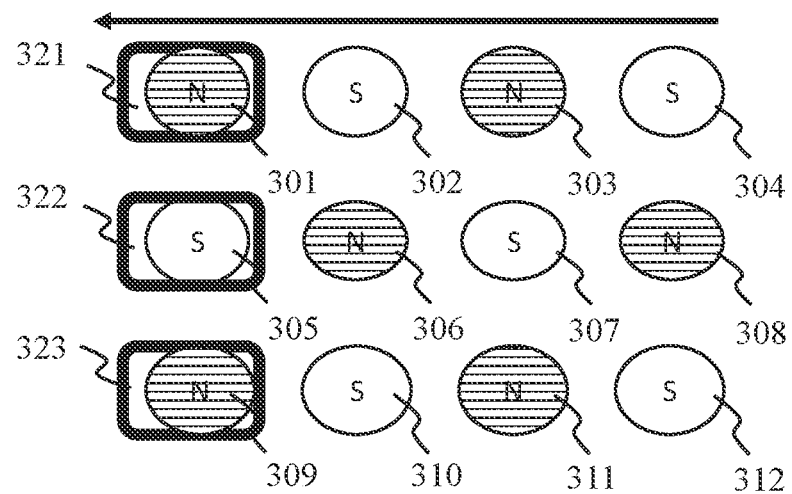

FIG. 3b schematically indicates an arrangement in which the rows of permanent magnets are arranged in the vertical direction, i.e., parallel. There are a total of twelve permanent magnets 301-312 in this instance, with the polarity alternating both horizontally and vertically. The coil with a three-pronged core is rotated by 90° here, so that the prongs 321-323 are arranged along the vertical direction. The tines of the core are swept over simultaneously by three magnets, respectively. This thereby increases the field strengths of the magnetic fields which are generated in the core. This also increases the voltages induced in the coil and thereby the signal strengths. In this way, larger distances between the permanent magnets and the coil can be achieved without the signal being too weak.

Figure 3C:
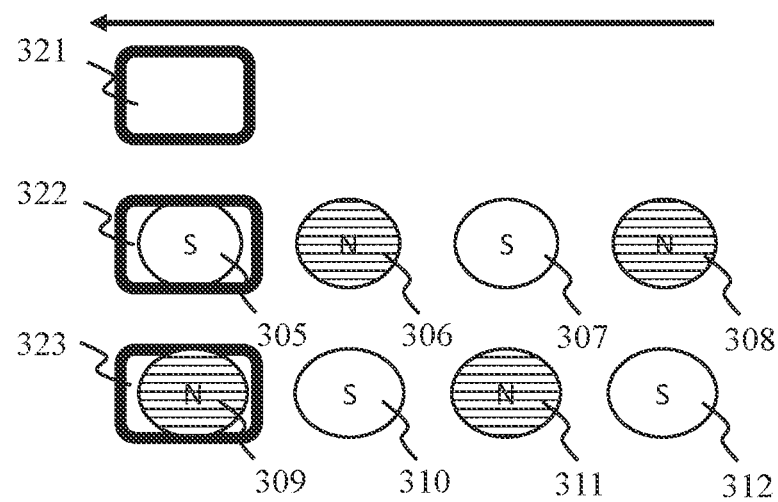
Figure 3D:
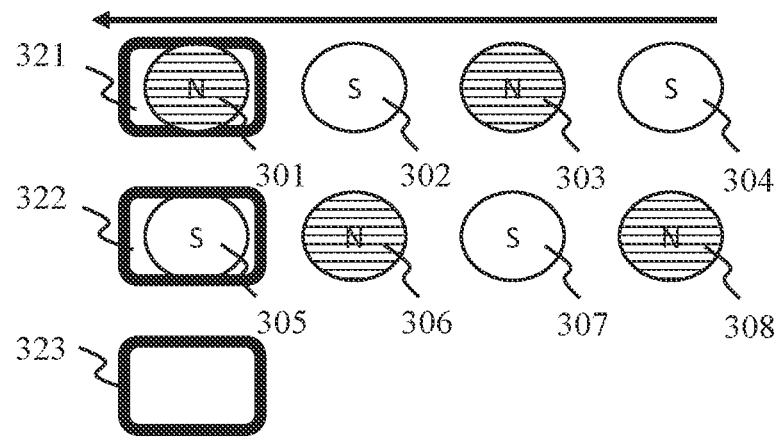

FIGS. 3c and 3d schematically indicate variations of the arrangement shown in FIG. 3b with only two rows and eight permanent magnets, respectively.

The specific arrangement of permanent magnets can also be utilized, for example, in order to identify the weapon parts in, or on, which they are arranged. For example, different breech systems can be coded and thereby identified by a corresponding selection of permanent magnets and lengths of permanent magnet arrangements. For example, FX or UTM practice breech systems whose breeches differ from standard live-fire breech systems are utilized in realistic practice with paint-marked ammunition. These can have, for example, longer or shorter arrays of permanent magnets. For example, the standard slide can include four permanent magnets, while the practice slide can include five or six. Another way to differentiate this is to use magnets of different sizes and strengths and code different closures over them. Both approaches can also be combined. For example, an odd number with 2N+1 for the magnets can be utilized and the additional (2N+1) the magnet can be selected to be much smaller or weaker, for example, or its distance from the magnet in front of it cannot match the distance between the other magnets. The signal of this magnet is recognizable in the overall signal, so that the distinction between counter-recoil and recoil travel still remains possible despite an odd number of magnets. In a microcontroller which is utilized for signal evaluation, these slide codings can subsequently be stored accordingly for recognition and evaluation.

In addition to the measurement signal, a reference signal can be generated which can be incorporated, for example, as a dynamic threshold value, i.e., one which is thereby dependent on the course of time and the individual geometries. This and other aspects of the examples will be explained in the following.

FIG. 4. shows a block diagram of an example circuit for generating a measurement voltage $IN_+$ and optionally an additional reference voltage $V_{in}$, which are supplied to a signal evaluation unit 420. In this case, an AC voltage of Ue is generated by a voltage generation unit 401, in this example inductively by a coil. Measurement signals and reference signals are generated therefrom in a signal processing unit 410. The signal processing unit 410 can comprise, for example, only an ADC and a rectifier circuit for rectifying voltages and/or can comprise further elements. Utilizing a rectifier, for example, means that the measurement signal $IN_+$ can be half-wave rectified and the reference signal $V_{in}$ can be rectified. By means of the ADC, signals which can be processed for the signal evaluation unit 420 can then be generated from the IN+ and Vin, and these signals can be evaluated in the signal evaluation unit 420.

Additionally, as shown in FIG. 4, one or more time determination units 450 can be provided. These can be utilized in order to measure the elapsed times between different points in time.

In one example, one of the timing units comprises, for example, an internal or external cycle source in combination with a timer. The timer hereby counts the cycles and knows the time intervals between the individual cycles. It can then calculate a time from this.

One of the timing units can also include a capacitor which discharges in a defined manner across a load. In this case, the capacitor charges electrically with each shot signal via the AC voltage $U_e$ generated during a recoil travel and/or counter-recoil travel and is then rectified, and discharges in a defined manner via the load, e.g., a resistor. The capacitor thereby discharges continuously across the load even when the signal evaluation unit 420 no longer has an operating voltage available. As soon as the signal evaluation unit 420 is supplied with a supply voltage again after a shot being fired, then it measures the voltage at the capacitor by means of an analog-digital converter and evaluates it. The time intervals/time durations are thereby estimated via the degree of discharge of the capacitor or the voltage at the capacitor.

In addition, the output voltage $U_e$ can be used to generate a supply voltage $V_{cc}$ for operating the signal evaluation unit 420 and the time calculation unit 450.

Figure 5:
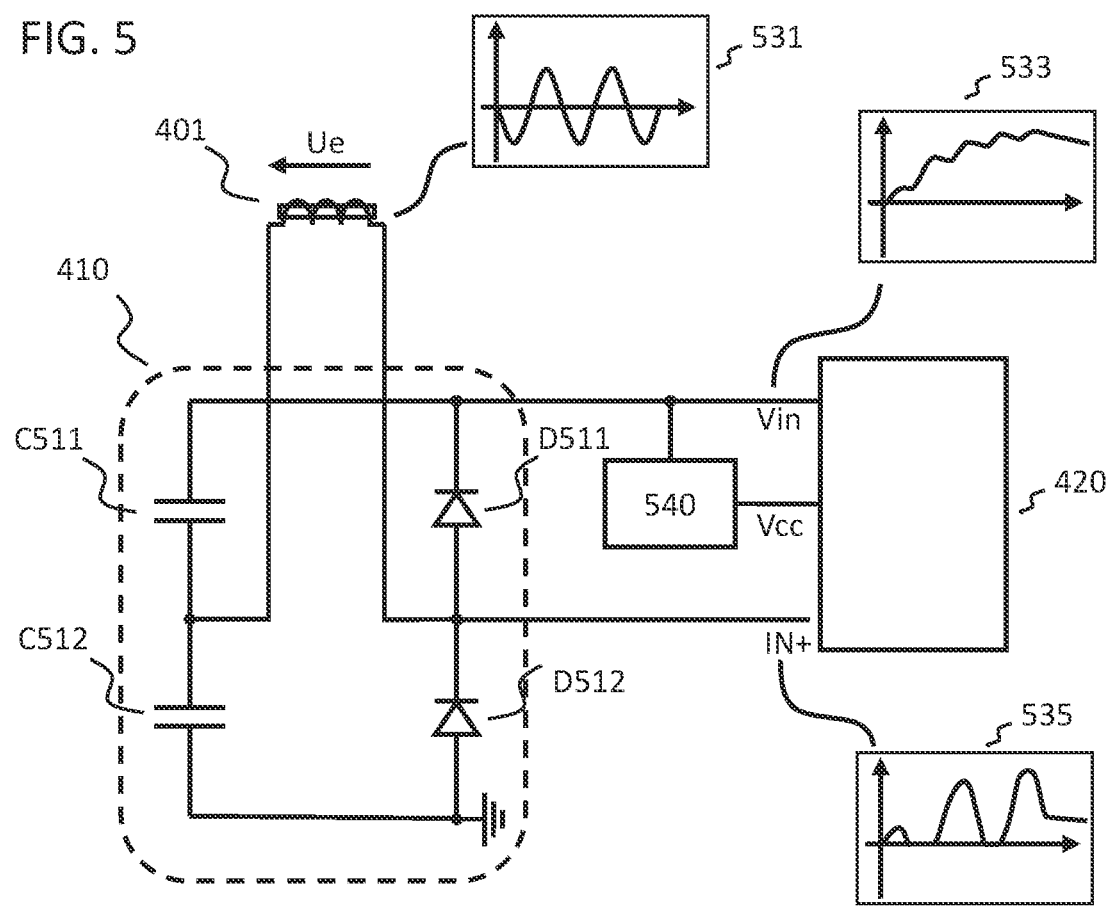
FIG. 5 shows a circuit for generating, processing and evaluating the signals, in which a Delon circuit is utilized for signal processing.

FIG. 5 indicates an example in which the signal processing unit 410 for rectification comprises a voltage multiplier circuit, in particular a signal doubling circuit, especially a Delon circuit.

FIG. 6 indicates such a Delon circuit 600. The Delon circuit consists of two diodes D1 and D2 respectively (one-way rectifier circuits), as well as two capacitors C1 and C2, with a load (not represented) which is connected downstream. Now, when a time-limited AC signal (e.g., one induced during a shot being fired) $U_e$ is coupled into the Delon circuit, then the following occurs:

Diode D1 generates a pulsating DC voltage from the positive half-wave of the AC voltage signal $U_e$. Diode D2 generates a pulsating DC voltage from the negative half-wave of the AC voltage signal. The reverse voltage of the two diodes D1 and D2 must be at least twice as large as the peak value of the coupled AC voltage signal. The two capacitors C1 and C2 are thereby alternately charged, almost to the peak value of the AC voltage signal $U_e$. The rectified voltage U at the output of the two diodes D1 and D2 must be at least twice as high as the peak value of the coupled AC voltage signal. The rectified voltage $U_a$ at the output of the Delon circuit is then approximately twice the peak value of the coupled AC voltage signal in the unloaded case.

Returning to FIG. 5, when the coil is swept over by the 401 alternately poled permanent magnets, then an AC voltage $U_e$ is induced in the coil. In the following, the $U_e$ measurable signal directly at the coil 401 as an AC voltage U is referred to as the base signal/output signal $IN_0$. The qualitative curve of $IN_0$ is indicated in Plot 531. The measurement signal $IN_+$ and the reference signal $V_{in}$ are subsequently generated from IN in the signal processing unit 410. The qualitative progressions of $IN_+$ and $V_{in}$ are indicated in Plots 533 and 535. In addition, in this example, a linear regulator is utilized in order to generate a 540-operating voltage $V_{cc}$ for operating the signal evaluation unit 420.

In order to be able to generate the reference signal $V_{in}$, the voltage is tapped via both diodes D151 and D251. It corresponds to the sum of the voltages which are to be applied to the capacitors C511 and C512 and would theoretically increase with each half-wave until both capacitors are completely charged. The base signal $IN_0$ is therefore rectified and added up in the usual way at the Delon circuit. The voltage would theoretically be doubled. In practice, however, when each of the diodes D511 and D512 is passed through, then there is a voltage loss ΔU, e.g., 0.3 V, which depends on the diode. The voltage of the signal present after passing through the Delon circuit is therefore reduced by 2×ΔU, in this case e.g., by 0.6 V. The reference signal $V_{in}$ can be additionally reduced to a lower voltage by means of a voltage divider following the Delon circuit.

To generate the measurement signal IN+, in this example the basic signal $IN_0$ is half-wave rectified in the signal processing unit 41, whereby additional, ongoing signal processing steps are possible before or after this. This means that a pulsating signal IN+ is generated from the AC voltage signal $IN_0$, in which only the half-waves with negative or positive voltage amplitudes are included. For example, as shown in FIG. 5 only the voltage applied to diode D512 is tapped for the measurement signal $IN_+$. A voltage is therefore present there only for negative half-waves, while no voltage is present for positive half-waves due to diode D512 being switched to through flow forwards. This produces a half-wave rectified measurement signal $IN_+$ which is added by the capacitors C511 and C512. Since $IN_+$ is tapped at only one diode, namely D512, its voltage during the negative half-waves is ΔU greater than that of the reference signal $V_{in}$ tapped across both diodes. In some examples, the measurement signal $IN_+$ can still be brought to a lower voltage by means of a voltage divider which is not represented here. Again, the ratio of the resistors of the voltage divider must be selected so that the peak value of $IN_+$ does not become larger than the supply voltage $V_{cc}$ to ensure that the signal $IN_+$ is within the voltage range detectable by the ADC.

In this example, the voltage tapped across the two diodes D511 and D512, and/or across the two capacitors C511 and C512, is also regulated to 540 for an operating voltage $V_{cc}$, for example 3.3 V, by means of the linear regulator. $V_{cc}$ is then utilized in order to operate the signal evaluation unit, which can in particular comprise a microcontroller. As soon as $V_{cc}$ is greater than the voltage value which is required to operate the signal evaluation unit, for example 1.8V, then the signal evaluation unit becomes active and measures the voltages $IN_+$ and $V_{in}$. This measurement can be executed, for example, via an internal analog-to-digital converter (ADC) of the signal evaluation unit.

There is a voltage interval of $V_{cc}$ within which the detection of the breech movement takes place. The power generation that continues after this interval and after detection is complete is utilized in order to operate the signal evaluation unit and its associated equipment until all specified shot analysis functions have been concluded.

The length of this interval is determined by the time at which the signal evaluation unit 420 receives sufficient energy in order to commence signal sampling and evaluation and the time at which the measurement signal definitely falls below the reference signal. This point in time is reached when the time intervals between the amplitude lows and amplitude highs, i.e., the edge widths between these amplitude positions are exceeded by a certain period of time (e.g., twice the duration of the two largest edge widths is exceeded).

If, as described above, $V_{in}$ passes through a voltage divider, then the ratio of the resistors of the voltage divider must be selected in such a way that the peak value of $V_{in}$ does not become greater than the supply voltage $V_{cc}$. This ensures, for example, that for sampling the signal, $V_{in}$ is within a voltage range detectable, for example, by an ADC of the signal evaluation unit 420.

FIG. 7 now graphically illustrates how a comparison of the measurement signal $IN_+$ and the reference signal $V_{in}$ is utilized in order to determine points in time which are indicative, for example, of a counter-recoil or recoil of the breech of a weapon. In principle, for the procedure described, the measurement signal needs only to oscillate and need not necessarily be half-wave rectified, as shown in FIG. 7. The measurement signal can therefore in principle also comprise half-waves with negative and positive half-waves.

The time points t701-t706 and t711-t714 which are indicated in FIG. 7 are determined as follows:

At times t701, t703 and t705, the measurement signal $IN_+$ exceeds the reference signal $V_{in}$. In the signal waveforms which are indicated in FIG. 7, this corresponds to the points at which the initially smaller measurement signal crosses the initially larger reference signal. At times t702, t704 and t706, the measurement signal falls below the reference signal or a threshold voltage $U_0$. Which is derived from it. In the signal characteristics indicated in FIG. 7, this subsequently corresponds to the points at which the initially larger measurement signal crosses the initially smaller reference signal. Furthermore, time points t711-t714 can be determined between which the measurement signal is smaller than and/or equal to a an additionally predetermined threshold value. In the signal waveforms which are indicated in FIG. 7, the threshold value is zero and time points t711 and t713 correspond to the points at which the initially larger measurement signal becomes zero, and time points t712 and t714 correspond to the points at which the measurement signal becomes greater than zero.

The threshold voltage $U_0$ thereby serves as a predeterminable threshold value and is in any case less than, or equal to, the minimum value of the reference signal.

The time intervals between two points in time, and/or the elapsed time durations (time segment durations) of the time segments which are defined by the first and second points in time, can be determined by utilizing one of the time determination units 450 described above.

For example, the pass-through duration, i.e., the temporal pass-through length of the determined signals, can be determined. For example, the first time point t701, the respective moment at which the measurement signal, i.e., the first amplitude of this signal, is greater than the reference signal for the initial time, can be selected, and the second time point t706, the moment at which it is definitely lower than the reference signal and remains so, can be selected. The difference in time of these two time points therefore gives the pass-through time mentioned above. Alternatively, the second time point t706 can also be determined, for example, as in the case of the voltage interval of $V_{cc}$ described above within which the detection of the slide movement takes place, and/or the first time point t701 can also be defined, for example, by the time point at which the operating voltage becomes greater than the voltage value which is necessary for the operation of the signal evaluation unit. If the length of the path along which the alternating voltage $U_e$ on which the measurement signal $IN_+$ is generated is known, then the average speed of a recoil travel or counter-recoil travel can be determined from this together with the pass-through time.

In another example, the time intervals between two successive positive edges can alternatively or additionally also be determined for speed determination. In FIG. 7, this corresponds, for example, to the time points t701 (first time) and t703 (second time) or t703 (first time) and t705 (second time). The time interval between these first and second time points subsequently corresponds approximately to one period of the AC voltage $U_e$. In the case of the solenoid-coil arrangements for voltage generation which is described in FIGS. 3a-d, for example, one period corresponds exactly to one sweep of the coil by two successive permanent magnets. Again, if the distances d and widths x of the magnets are known, then the speed during this period can be determined, e.g., via:

$$v = \frac{2x + 2d}{t705 - t703}.$$

Preferably, the speed is estimated by the distance between two magnets and the time interval:

$$v = \frac{d}{t705 - t703}.$$

Analogously, the time intervals between negative edges over the time points t702, t704 and t706 or the time intervals between time points t711 and t713 or t712 and t714 can also be utilized.

From several speeds which are determined in this way and which belong to successive time periods/time intervals, an average speed of movement or even the acceleration of the respective slide movement can be estimated. The acceleration is determined over at least two speeds and the time intervals between the associated time segments; For example, in the case of two speeds in accordance with $$a = \frac{dv}{dt} \approx \frac{v(t_2) - v(t_1)}{t_2 - t_1}.$$

Generally speaking, if the distance and length of the voltage-generating part of the voltage-generating unit 110 are known, then the duration of the signal or the durations of individual signal sections can be utilized in order to determine the speed and, if necessary, the acceleration with which the voltage-generating part of the weapon moves during firing or manual reloading. This makes it possible, for example, to distinguish between the fast movements of the breech block during firing and the slower movements during manual reloading. The acceleration can also be utilized in order to determine the propellant charge which is used.

In one example, a battery-independent or also battery-dependent acceleration sensor is provided in the firearm analysis device in addition to, or as an alternative to, the measurement of the acceleration of the breech movement which is described above.

Until now, one problem encountered with battery-free shot counters with regard to the measurement of dynamic accelerations on the weapon by means of sensors was that these accelerations could not be measured and registered because the signal evaluation unit can still have been deenergized at the time the signal was generated.

In one example, this problem is solved by temporarily storing the acceleration signal in a charging capacitor until the signal evaluation unit has been supplied with sufficient current in order to evaluate the stored acceleration signal.

Based on the measured acceleration, the firing of different types of ammunition (combat ammunition, manoeuvre ammunition, training ammunition) can be detected and, if necessary, stored. This can be executed, for example, on the basis of the different acceleration pulses of moving parts such as the breech or the different recoil pulses on the overall system.

In a further example, the measurement signal is converted into a digital measurement signal $dIN_+$. This can be implemented, for example, according to the rule $$\begin{aligned}
&\text{if } (IN_+ \geq V_{in}) \\
&\quad dIN_+ = 1 \\
&\text{else if } (IN_+ \leq U_t) \\
&\quad dIN_+ = 0 \\
&\text{else} \\
&\quad dIN_+ = \text{empty},\\
&\text{where } U \leq_t \text{minimum } (V_{in}), \text{happens.}
\end{aligned}$$

In a further example, a digital measurement signal $dIN'_+$ is generated according to the rule $$\begin{aligned}
&\text{if } (IN_+ \geq V_{in}) \\
&\quad dIN'_+ = 0 \\
&\text{else if } (IN_+ \leq U_t) \\
&\quad dIN'_+ = 1 \\
&\text{else} \\
&\quad dIN'_+ = \text{empty}
\end{aligned}$$

FIG. 7 illustrates both exemplary principles. If the measurement signal is greater than or equal to the reference signal, then the digital measurement signal has the value 1 (and/or 0) in this time interval. If the measurement signal is smaller than a threshold voltage $U_0$, then the digital measurement signal has the value 0 (and/or 1) in this time interval. The threshold voltage of $U_0$ serves as a predeterminable threshold value and is, in any case, smaller than or equal to the minimum value of the reference signal. In all other cases, no value is assigned to the digital measurement signal. In FIG. 7, this is indicated by shaded and non-shaded blocks. The durations of the signal intervals (width of the blocks) during which the digital measurement signal is 1 or 0, and if necessary, possibly also during which no value is assigned to it (empty), can again be determined, for example, via the time points t701-t706 or t711-t714. For example, the time points t701, t703 and t705 can be determined via the time points at which the digital measuring signal $dIN_+$ alters from "0" or "empty" to "1", and the time points t702, t704 and t706 via the time points at which the digital measuring signal (dIN+) alters from "1" or "empty" to "0".

Figure 8A:
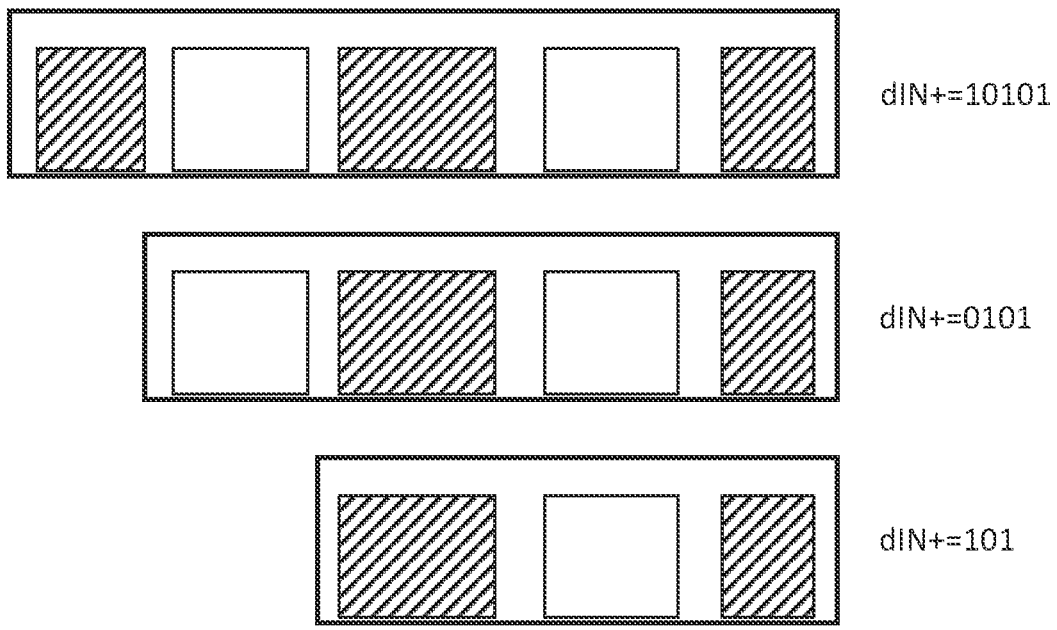
FIGS. 8a and 8b show the uniqueness of the digital measurement signal.
Figure 8B:
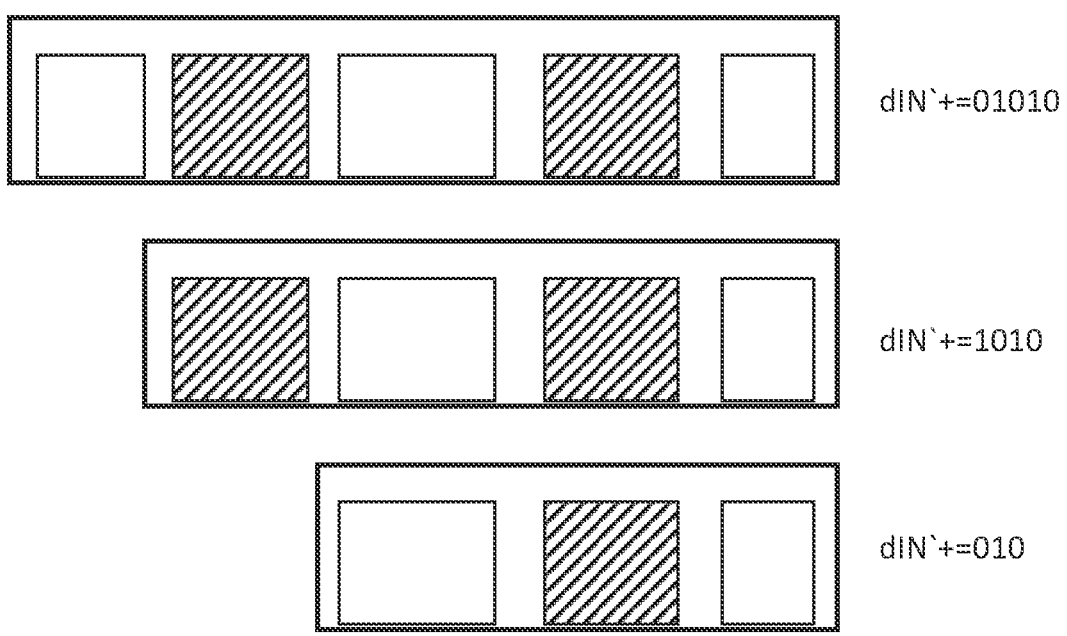

In one example, the sequence of digits, i.e., the zeros and ones of the respective measured signal can be utilized in order to determine whether the slide is located in recoil or counter-recoil. This is because if the poles of the respective magnets facing the coil and the sign of the voltage they induce when sweeping the coil are known, then the measured 1-0 sequence unambiguously identifies whether a counter-recoil travel or recoil travel is present. If the recoil travel leads to sequence 10101, as shown in FIG. 8a, then the counter-recoil travel will necessarily lead to sequence 01010, as shown in FIG. 8b, which is the inverse of this sequence. Advantageously, such identification of the direction of movement of the slide can be determined even when the signal evaluation unit was unable to acquire the signal completely, for example because the operating voltage required for signal evaluation was not reached until later. This is illustrated by FIGS. 8a and 8b, in which it can be seen that the sequence of digits which is typical of a direction of travel is suitable for determining the direction of travel down to a minimum number of three digits. It is therefore possible to determine unambiguously, with only three digits of the digital measurement signal, whether a counter-recoil travel or recoil travel took place. Depending on when the signal was registered, a recoil travel will lead to the sequences 10101, 0101 and 101 and a counter-recoil travel will lead to the sequences 01010, 1010 and 010. If, for example, the voltage generation for the signal evaluation unit is delayed or if it ramps up too slowly for whatever reason, then a certain characteristic minimum section of the signal will be sufficient in order to determine the direction of travel, even after the start of the signal has not been registered. By determining these at least three end digits as a direction-specific signal, one can prevent false messages or no messages for signal detections.

In further examples, the signal evaluation unit determines whether a shot was fired in single fire or continuous fire. In addition, it is also possible to determine the various cadences/firing rates in single fire. For this purpose, for example, predetermined time limit values, which are e.g., based on measured values determined in the laboratory, can define time ranges/time limit ranges (time intervals/time limit intervals). The range within which the determined duration lies will subsequently determine whether continuous fire or single fire is present, and/or also the firing rate. The following examples illustrate this procedure.

Example 1: One timed limiting value, automatic weapon. If the duration is located above the limit (time range 1), then single fire is assumed; if it is located below the limit (time interval 2), then continuous fire.

Example 2: One timed limiting value, semi-automatic weapon. If the duration is located above the limit (time range 1), then slow single fire is assumed; if it is located below the limit (time range 1), then rapid single fire.

Example 3: Two timed limiting values, automatic weapon. If the duration is located above the second, larger limiting value (time range 1), then slow single fire is assumed. If it is located between the first and the second limiting value (time range 2), then rapid single fire is assumed. If it is located below the limiting value (time range 3), then continuous fire is assumed.

Instead of a timed limiting value and time durations, a voltage limit value and measured voltage values can also be utilized, depending on the example and/or the time determination unit which are utilized.

In order to determine the duration, for example, for the end of the measurement signal generated during the counter-recoil from a first shot as the first time and the beginning of the measurement signal generated during the recoil of a second, subsequent shot as the second time. From the duration between the first and second time point, the time interval between individual shot firings can be inferred and from this the firing mode and possibly also the firing rate.

In one example, the timing determination unit described above, comprising a cycle source and timer, determines the duration between the first and second time points.

In another example, in order to determine single-fire or continuous-fire sequences, the timing unit described above, comprising a capacitor and a resistor, is integrated after rectification of the signal. As described, the capacitor charges when a shot is fired and then discharges continuously through the resistor. Depending on the state of charge of the capacitor when the signal evaluation unit is reactivated during the subsequent firing, the delivery of single fire (long sequences or pauses lead to lower state of charge) or continuous fire (very short sequences lead to higher state of charge) can be determined. Theoretically, the degree of discharge can be converted into a time value. However, the detour via a time value determination need not be taken and the voltage values which are applied to the capacitor can be utilized directly. They then represent a corresponding time value without having to calculate it explicitly. For example: if the voltage value in the capacitor falls below a specified threshold value, then this can be evaluated as a firing sequence in single fire when the discharge time of the capacitor with resistor is known. If the voltage value in the capacitor does not fall below the threshold value, then this can be evaluated as a shot sequence in continuous fire.

Another example distinguishes single fire sequences or continuous fire sequences by the following devices and methods:

If the alternatively poled magnets brush over the stationary coil, then the induced voltage will supply the signal evaluation unit, e.g., consisting of a microcontroller, and the upstream capacitors with energy. If the operating voltage is sufficient, then the signal evaluation unit is ready for operation and is in an active mode. In this mode, it will evaluate the AC voltage signal as described, then it activates an internal or external cycle source, as well as a timer and configures an interrupt-capable pin, e.g., of a microcontroller.

The signal evaluation unit is then set to a low-power mode in which it requires only a fraction of the current and can thereby remain active for a relatively long time during the slide cycle. In low-power mode, the signal evaluation unit is supplied with electrical energy exclusively from pre-charged backup capacitors.

After a recoil travel, it therefore remains active until the voltage is induced again during the subsequent counter-recoil travel in order to operate the signal evaluation unit. The renewed voltage induction is subsequently communicated to the signal evaluation unit via an additional synchronization circuit. The synchronization circuit can, for example, apply a voltage to the interrupt-capable pin, whereupon this generates an interrupt in the signal evaluation unit and the signal evaluation unit alters from low-power to active mode again.

While the signal evaluation unit is located in low-power mode, the timer counts the cycles of the cycle altered source. Since the cycle frequency of the cycle source is known, the signal evaluation unit can convert the number of cycles retrieved by the timer into a time value.

This happens as soon as it is again supplied with an operating voltage by a shot signal and has altered to the active mode so that it can utilize the counted cycles of the timer. In this way, the signal evaluation unit determines the time between two active phases and can therefore determine the different firing sequences.

When using a low-power mode, two basic scenarios can occur:

If the time between two shots is short enough, then the voltage in the back-up capacitors is sufficient in order to retain the signal evaluation unit in low-power mode until the next shot signal. A synchronization circuit subsequently generates a voltage at an interrupt-capable pin. As soon as the voltage is generated at the interrupt-capable pin in low-power mode, then an interrupt signal is generated, which informs the signal evaluation unit of the presence of a new shot signal. The signal evaluation unit subsequently switches back to active mode and starts measuring and evaluating the AC voltage signal as described above.

One advantage of this low-power circuit is therefore that the signal evaluation unit remains permanently activated during slide recoil and slide counter-recoil, and this activation is not interrupted and has to be restarted.

In the second case, the time between two shot signals is so far apart that the charge of the back-up capacitors is not sufficient to permanently supply the signal evaluation unit. In this case, the operating voltage would be below the minimum voltage which is required for proper operation and the signal evaluation unit is deactivated. At the next shot signal, the signal evaluation unit is started with a hardware reset.

The difference for whether switching to the active mode from a low-power mode or from the off-state will be executed is detected by means of an internal register of the signal evaluation unit.

Another example uses these both scenarios in order to distinguish between continuous fire and single fire. In the extremely short firing cycles of a continuous fire, in contrast to single fire, the signal evaluation unit can remain active in low-power mode even during the slide counter-recoil and until the next shot is fired and is continuously ready. This permanent activation over several firing cycles subsequently serves as a distinguishing feature between continuous fire and single fire, since in the latter, the activation will usually be interrupted. In addition, the times which go beyond one firing cycle can also be measured in this way.

The result with this solution, is directly a time (cycles). In addition, an activation after an off-state can be concluded to a slow rate of fire in the single fire.

In another example, the shot analysis system described is peripherally equipped with a battery and an additional cycle for integrating a time stamp. In this way, all activities in the shot analysis system which is associated with the measurement signal can be verified with time accuracy, in particular the date and time at which the registered shots took place. By using a battery exclusively for the time measurement, batteries with only very small capacities and small external dimensions are required, which furthermore guarantee a reliable power supply for this real-time measurement, even after years or even decades. If such a battery fails, then all other described functions of the shot analysis system can still be guaranteed.

As described above, examples disclosed herein improve the diagnostics for firearms and, in particular, to enable a more advanced analysis of the firing of shots beyond the mere counting of shots.

Disclosed examples relate to a firearm analysis device for determining indicative/characteristic parameters for a firearm from a shot which is discharged from it. The firearm analysis device can also be a firearm diagnostic device. For example, the firearm analysis device includes a voltage generation unit, a signal processing unit, a signal evaluation unit and a time determination unit.

The voltage generation unit generates an AC voltage signal when the slide, for example, moves backwards and forwards as a result of a shot being fired. If necessary, this is pre-processed in the signal processing unit into a usable measurement signal e.g., by an analog-to-digital converter (ADC) or a rectifier circuit. The signal evaluation unit subsequently analyzes the measurement signal and uses it to determine information about the weapon and/or shot discharged. For this purpose, it refers back to time information such as durations which are determined in the time determination unit, if necessary.

The voltage generation unit is therefore designed to generate an alternating voltage during the counter-recoils travel and/or recoil of a movable weapon part e.g., the slide of a pistol, during firing. The voltage can be generated along a section of the distance which is covered by the movable weapon part during recoil or counter-recoils travel. The voltage can be generated by, for example, means of a solenoid-coil arrangement as described, for example, in U.S. Pat. No. 8,046,946 B2 (Packer Engineering, Inc.) or in EP 3 140 605 B1 (Heckler & Koch GmbH). The inductively generated alternating voltage signals known from EP 3 140 605 B1 can therefore be utilized for the firearm analysis devices disclosed herein. Use of these signals has the advantage that no new, additional basic signals need to be generated and components which are already known for firearms can be used for voltage generation. However, alternating voltage signals generated in other ways, e.g., via Piezo elements or electromechanical inverters, are also conceivable. Regardless of how they are generated, the AC voltage signals subsequently serve as input signals to the signal processing unit.

The signal processing unit can therefore be utilized to convert the generated AC voltage into a usable measurement signal in the further device components. For example, the analog AC voltage signal can be provided without pre-processing. In this case, the measurement signal would be identical to the AC voltage signal. Alternatively, it can be digitalized by using an analog-to-digital converter (ADC), for example, and additionally pre-processed as an alternative or additional option. For this purpose, the signal processing unit can comprise further suitable switching elements such as filters, rectifiers.

According to some examples, a reference signal and/or a supply voltage for the downstream signal evaluation unit is additionally generated in the signal processing unit. The reference signal can be utilized, for example, as a dynamic comparison value for the analysis of the measurement signal. The measurement signal and/or reference signal is subsequently evaluated in the downstream signal evaluation unit.

The signal evaluation unit can comprise a microcontroller, for example. It is generally utilized for evaluating and analyzing signals. In particular, it can serve in order to determine time points and parameters such as speed, acceleration, cadences/firing rates or firing modes. For example, the signal evaluation unit can be designed to determine a first and a second point in time during the counter-recoil travel and/or recoil of the moving weapon part. These can be, for example, specific points in time in the course of the measurement signal, such as at the beginning and at end of the signal or the beginning and end of a period or half-period within a signal.

The time determination unit or time measurement unit is generally utilized for time measurement and it can quite generally determine durations such as signal durations, durations of signal or time sections, or distances between individual signals or time points which are located within a signal or distributed over several signals. In particular, it is utilized to determine the time intervals between first and second time points. Time determination units can therefore be any devices which are suitable for the relative or absolute determination of durations. For example, clocks, cycle generators in combination with a timer which counts the cycles and knows the time intervals between successive cycles, and capacitors whose degree of discharge serves as a measure of an elapsed time.

The described firearm analysis device can be utilized in order to obtain a wide range of information from which parameters such as speeds and accelerations of the slide/breech during firing, rates of fire or ammunition types can be derived. New additional information can therefore be obtained in an advantageous manner from the signals which are already known. The additional information relating to firing such as number and intensity, for example, provides more concrete indications for estimating firearm wear. The servicing and maintenance of firearms can therefore be improved and facilitated, ultimately increasing safety in their handling. In addition, such advanced information can be utilized for documentation and monitoring, as well as for logistical purposes (e.g., stocking of spare parts and ammunition) for firearm use. Manufacturers can incorporate such data, for example, in the improvement and additional, ongoing development of weapons. Finally, detailed information regarding the shots fired with a weapon also facilitates forensic investigations.

Another aspect of the examples disclosed herein relates to a firearm comprising a firearm analysis device.

Another aspect of the examples disclosed herein relates to a method for determining parameters which are indicative of a firearm from a shot which has been discharged.

The method can be used generally to determine parameters and further information about firearms and firearm discharges. To this end, it can comprise, for example: detecting AC voltages, providing at least one measurement signal based on the AC voltage, determining at least a first and a second time point of counter-recoil travel and/or recoil, and determining at least one time period duration i.e., a duration of time periods which are defined by the first and second time points.

The method can therefore utilize the components of the firearms analysis device which is described above.

The alternating voltages can have been generated during a counter-recoil travel and/or recoil travel of a moving weapon part during a firing operation; for example, by the voltage generation unit which is described above.

The measurement signal can be generated based on the generated AC voltages.

The first and second time points include the examples as described above.

The determination of the durations can be executed, for example, by means of the time determination unit which is described above. While the examples disclosed herein are claimed, further features of design examples or examples can result from the dependent claims, the accompanying technical drawings and the following description. Other claims are possible.

Another aspect disclosed herein relates to a computer program product which includes computer-readable instructions for executing some of the method steps.

In one example, a reference signal will be generated from each generated AC voltage or signal based thereon; for example, by a rectifier circuit located in the signal processing unit. The generation of a reference signal has the advantage that it can serve as a dynamic reference value or threshold value for the measurement signal. In this case, dynamic means that, at each point in time, the value for each weapon and even each signal will be determined individually. For example, a first time and a second time can then be determined, for example, by the signal evaluation unit on the basis of a comparison of the measurement signal and the reference signal; for example, by means of a comparison of the time courses. It is hereby exploited so that variations in the amplitude of the AC signal (e.g., by variations of the distances between the solenoid and coil or for the speeds) will amend the amplitude of the reference signal as well as of the measurement signal, although the ratio of the reference signal and the measurement signal remains the same.

In another example, the voltage generating unit can comprise a minimum of two magnetic poles and a coil. In this case, the minimum of two magnetic poles can be arranged in succession in such a way that they move on a path which is relative to the coil in response to a shot being fired. Successive poles thereby each have opposite polarizations to each other. The poles can pass the coil successively in such a way that they induce oppositely directed voltages in the coil, one after the other, during a recoil travel and/or counter-recoil travel. Such voltage generation units are easy to manufacture and reliably provide suitable AC voltage signals.

In a further example, the time points are determined according to when the measurement signal exceeds or falls below the reference signal or a threshold value which is derived therefrom. For example, the first time point can be determined according to when the measurement signal exceeds or falls below the reference signal or a threshold value which is derived therefrom. Furthermore, the second time can be determined according to when the measurement signal exceeds or falls below the reference signal or a threshold value which is derived therefrom again after the first time. The reference signal thereby serves as the dynamic reference value which is described above for the analysis of the measurement signal. The desired time points can therefore be determined in a simple way from the course of the two signals over time. For example, the duration of a period of the measurement signal can also be determined in this way. This is executed, for example, in the signal evaluation unit.

In a further example, the speed of a moving part of the firearm during recoil and/or counter-recoil travel is determined using the measurement signal and the reference signal. For this purpose, the first time period and the second time period can be determined during a single recoil or a single advance of the moving parts of the firearm. Based on the determined time interval duration of the time interval, which is defined by these two instants and a length of a distance along which the alternating voltage of this time interval underlying the measurement signal is generated during the recoil travel and/or counter-recoil travel, then the speed of the moving weapon parts during this time interval can therefore be determined. For example, a corresponding first and a corresponding second position on a path along which the voltage generation unit generates the AC voltage underlying the measurement signal can be assigned to the first time and the second time via the measurement signal. The speed is then determined from the time interval duration and the distance between the first and second positions. The speed determination can be executed, for example, by the signal evaluation unit, with the duration being determined, for example, by one of the time determination units. In this way, the speed of, for example, the slide can therefore be determined for each shot which is fired, which is advantageous, for example, for monitoring, servicing and maintenance of the weapon.

In a further example, the respective speeds of the moving weapon parts are determined during at least two successive time intervals and the acceleration of the moving weapon parts during their recoil or counter-recoil travel is determined from the determined speeds and a time distance between at least two successive time intervals. In this way, the acceleration of the moving weapon parts can additionally be determined in a simple manner from the signal which is already present, which enables conclusions to be drawn about the ammunition which has been utilized for example.

In another example, the signal processing unit provides a supply voltage based on the AC voltages for operation of the signal analysis unit. This enables the entire firearm analysis device to be operated without batteries.

In a further example, the reference signal is rectified e.g., during its generation. For this purpose, the signal processing unit comprises, for example, a rectifier circuit for rectifying the voltages. For example, the reference signal can therefore be distinguished from the measurement signal by the fact that it is not modulated or only slightly modulated and/or is non-periodic. A rectified reference signal can also advantageously be evaluated by signal evaluation units which can only detect direct currents. This is usually the case, for example, with microcontrollers. Finally, the rectified reference signal can also be utilized in order to supply DC current to the signal evaluation unit.

In a further example, the measurement signal is half-wave rectified or non-rectified during its generation e.g., by the signal processing unit. It thereby remains distinguishable from the reference signal e.g., because it is modulated and/or non-periodic. Moreover, it still contains the phase information of the generated AC voltage. The half-wave rectification can be executed in this case, for example by the rectifier circuit utilized for rectifying the reference signal or parts thereof.

In a further example, the reference signal is also added up during its generation. A voltage doubling circuit can therefore be utilized in this case. For example, the signal processing unit comprises a Delon circuit as the rectifying circuit for this purpose. In addition to rectifying, the Delon circuit also acts as a voltage doubler. The rectified signals are thereby additionally amplified.

In another example, the time determination unit comprises a timer and a cycle source, wherein the timer determines durations via a number of the cycles and a time interval between the cycles. The time intervals and durations can therefore be determined in a simple and verified manner.

In a further example, the time determination unit comprises a capacitor which is connected to a load, whereby the capacitor is charged during a recoil travel and/or counter-recoil travel by the AC voltage generated in the process and the durations are determined via the degree of discharge of the capacitor. In this way, time measurement is possible over a certain period of time, even when the power supply is not present.

In a further example, it will be determined whether a shot is fired in single fire or in continuous fire. For this purpose, for example, the time interval (time distance) between individual firings can be determined. For example, by determining the first time as the end of a measurement signal which is generated during a preliminary firing and determining the second time as the beginning of a measurement signal generated during a recoil fire following this preliminary firing. The durations of the time periods defined by the first and second time points can subsequently determine the time distance between individual firings. The duration of the time interval as defined by the first time point and the second time point can then be utilized in order to determine whether a shot has been fired in continuous fire or single fire mode. This can be executed, for example, in the signal evaluation unit. In this case, it is determined that continuous fire is present when the time distance duration between the multiple counter-recoil travels or multiple recoil travels of moving weapon parts are below a time limit value or voltage limit value, and otherwise that single fire is present. Additional conditions can also be incorporated as criteria for the presence of continuous fire e.g., that the firearm can be fired in continuous fire and/or that several counter-recoil travels and recoil travels have been detected. In this way, information about the load on the firearm is accessible in a reliable and simple manner, e.g., for maintaining it.

In a further example, time distance ranges (time interval ranges) are defined on the basis of the time distance limit value and/or a further time distance limit value. Based thereon, at least two different firing rates are determined in single fire and/or continuous fire. The determination is made based on which of these time distance ranges contains the time distance duration. This can all be done, for example, in the signal evaluation unit. This has the advantage that more detailed information is accessible e.g., for maintenance.

In a further example, the measurement signal is digitalized. For example, it can be converted into a binary signal. This can be executed, for example, by the signal evaluation unit. In the presence of a reference signal, it can therefore be converted into a digital measurement signal e.g., according to the following rule:

if (measuring signal ≥ reference signal)
   digital measuring signal = 1
else if (measuring signal ≤ U0)
   digital measuring signal = 0
else
   digital measuring signal = empty
where U0 ≤ minimum (reference signal).

In this way, the phase information can be converted into a binary signal and thereby a quickly and easily readable signal, with which, for example, recoil travel and counter-recoil travel can be encoded. The distinction of the barrel direction can therefore be inspected via the binary signal or the resulting coding.

In one example, the voltage generation unit uniquely codes the AC voltage it generates to the movable weapon part. For example, it can generate a signal uniquely by identifying the movable weapon part. For example, in a solenoid-coil arrangement, the magnets can be arranged in the movable weapon part and the number of magnets can therefore be indicative of the movable weapon part. Additional information about the firing and the weapons can therefore be obtained from the signal in a simple manner.

In one example, the digital measurement signal is utilized in order to determine first and second time points. For example, a first time point is determined according to when the digital measurement signal amends from "0" or "empty" to "1", and a second time point is determined according to when the digital measurement signal amends from "1" or "empty" to "0". The first and second time points can advantageously also therefore be determined from the digital measurement signal.

In a further example, the digital measurement signal is utilized in order to determine whether a recoil or an advance has been executed. For example, the sequence of signal sections in which the digital measurement signal is uninterrupted "1" or "0" can be used to determine whether the measurement signal is based on a counter-recoil travel or a recoil travel of the moving weapon parts e.g., by the signal evaluation unit. In this way, additional information can be obtained from the digital signal in a simple and reliable manner.

Another example includes a cycle in order to determine the time and/or date a shot was fired. For example, a logbook can be maintained with the date and time of weapon use and the data obtained therefrom.

A further example comprises an acceleration sensor by means of which the acceleration of the counter-recoil travel and/or recoil travel of the moving weapon parts can be determined. In this way, the acceleration of the moving weapon parts can be determined in a simple and proven manner, which enables conclusions to be drawn about the ammunition which has, for example, been utilized.

What is claimed is:

1. A firearm analysis device for determining parameters indicative of a firearm from a shot fired, comprising:
    a voltage generating unit arranged to generate an alternating voltage during travel of a movable weapon part during a firing operation of the firearm;
    a signal processing unit to generate a measurement signal from the generated alternating voltage, and to generate a reference signal from the generated alternating voltage;
    a signal evaluation unit to determine a first and a second time point during the travel of the movable weapon part based on a comparison of time curves of the measurement signal and the reference signal; and
    a time determination unit to determine a time interval duration between the first and second time points.

2. The firearm analysis device according to claim 1, wherein the voltage generating unit includes at least two magnetic poles and a coil, wherein the at least two magnetic poles are arranged in succession to move in a path relative to the coil in response to firing a shot, and wherein successive poles each include opposite polarizations to each other passing the coil in succession so as to induce alternating voltages in the coil during a recoil travel and a counter-recoil travel, respectively.

3. The firearm analysis device according to claim 1, wherein the signal evaluation unit is further to determine the first time point according to when the measurement signal exceeds or falls below the reference signal or a threshold derived therefrom, and to determine the second time point according to when the measurement signal again exceeds or falls below the reference signal or a threshold derived therefrom.

4. The firearm analysis device according to claim 1, wherein the signal evaluation unit is further to:
    determine the first time point and the second time point within the measurement signal of a single recoil travel or a single counter-recoil travel of the movable weapon part;
    assign to the first and the second time point, based on the measurement signal, a corresponding first and a corresponding second position on a path along which the voltage generating unit generates the alternating voltage; and
    determine a speed of the movable weapon part during travel from the time interval duration that is determined by the time determination unit and a distance between the first and second positions.

5. The firearm analysis device according to claim 1, wherein the signal processing unit is to provide a supply voltage based on the alternating voltages for the operation of the signal evaluation unit.

6. The firearm analysis device according to claim 1, wherein the signal processing unit includes a rectifier circuit for rectifying voltages based on the alternating voltage to generate the reference signal.

7. The firearm analysis device according to claim 5, wherein the signal processing unit is to half-wave rectify a signal based on the alternating voltage to generate the measurement signal by a rectifier circuit.

8. The firearm analysis device according to claim 6, wherein the rectifier circuit comprises a voltage multiplier circuit.

9. The firearm analysis device according to claim 1, wherein the signal evaluation unit is further to:
    determine a time difference between two successive shots over the time interval duration that is determined by the time determination unit, the first time point corresponding to an end of the measurement signal generated during a counter-recoil travel and the second time point corresponding to a beginning of the measurement signal generated during a recoil travel following the counter-recoil travel; and
    determine, based on a time difference between two successive shots, whether a shot has been fired in continuous fire or single fire, the determination including determining that the firing has occurred in continuous fire when the time difference between successive shots is below a predetermined time difference limit.

10. The firearm analysis device of claim 9, wherein the signal evaluation unit is further to determine firing rates, wherein based on the time difference limit value and at least one additional time difference limit value, the signal evaluation unit defines at least two time difference ranges, to each of which a firing rate can be assigned, and wherein the signal evaluation unit determines in which of these time difference ranges the time difference lies.

11. The firearm analysis device according to claim 1, wherein the signal evaluation unit is to convert the measurement signal into a digital measurement signal according to:

```
if (measuring signal ≥ reference signal)
    digital measuring signal = 1
else if (measuring signal ≤ U0)
    digital measuring signal = 0
else
    digital measuring signal = empty
where U0 ≤ minimum (reference signal).
```

12. The firearm analysis device according to claim 1, wherein the voltage generating unit is to generate a signal uniquely identifying the movable weapon part.

13. The firearm analysis device according to claim 11, wherein the signal evaluation unit is to determine, based on a sequence of signal sections in which the digital measurement signal is "1" or "0", whether the measurement signal is based on a counter-recoil travel or a recoil travel of the movable weapon part.

14. The firearm analysis device according to claim 1, further comprising an acceleration sensor to determine an acceleration of the movable weapon part.

15. A firearm comprising:
- a barrel through which a shot may be fired;
- a movable firearm part movable in response to firing of a shot;
- a voltage generating unit arranged to generate an alternating voltage during travel of the movable firearm part during a firing operation of the firearm;
- a signal processing unit to generate a measurement signal from the generated alternating voltage and to generate a reference signal from the generated alternating voltage;
- a signal evaluation unit to determine a first and a second time point during the travel of the movable firearm part based on a comparison of time curves of the measurement signal and the reference signal; and
- a time determination unit to determine a time interval duration between the first and second time points.

16. A method for determining parameters indicative of a firearm from a shot fired, the method comprising:
- detecting of alternating voltages generated during travel of a movable weapon part during a firing operation;
- providing a measurement signal which is based on the generated alternating voltages;
- providing a reference signal based on the alternating voltages
- determining a first and a second time point of travel of the movable weapon part from a comparison between the measurement signal and the reference signal; and
- determining a time interval duration between the first and second time point.

* * * * *